United States Patent
Hatakeyama et al.

(10) Patent No.: US 7,121,162 B2
(45) Date of Patent: Oct. 17, 2006

(54) PARALLEL SHAFT TRANSMISSION

(75) Inventors: Kazuma Hatakeyama, Saitama (JP); Yoshihiro Yoshimura, Saitama (JP); Takashi Hotta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 127 days.

(21) Appl. No.: 10/898,375

(22) Filed: Jul. 26, 2004

(65) Prior Publication Data

US 2005/0028622 A1 Feb. 10, 2005

(30) Foreign Application Priority Data

Aug. 7, 2003 (JP) ............... 2003-288686

(51) Int. Cl.
*F16H 3/08* (2006.01)
(52) U.S. Cl. .............. 74/360; 74/359; 74/357; 74/331; 74/329
(58) Field of Classification Search ............ 74/329, 74/331, 357, 359, 360
See application file for complete search history.

(56) References Cited

U.S. PATENT DOCUMENTS

| | | | | |
|---|---|---|---|---|
| 3,126,752 A | * | 3/1964 | Bolster | ............ 74/359 |
| 3,897,699 A | * | 8/1975 | Hoyer | ............ 74/745 |
| 4,023,418 A | * | 5/1977 | Zenker | ............ 74/15.86 |
| 4,682,516 A | | 7/1987 | Okubo | |
| 4,721,002 A | * | 1/1988 | Horii | ............ 74/329 |
| 4,858,495 A | | 8/1989 | Horsch | |
| 5,239,887 A | * | 8/1993 | Muller et al. | ........ 74/665 GA |
| 5,445,041 A | | 8/1995 | Zaiser et al. | |
| 5,819,587 A | * | 10/1998 | Leber et al. | ............ 74/331 |
| 2003/0131686 A1 | * | 7/2003 | Huber | ............ 74/664 |
| 2005/0193846 A1 | * | 9/2005 | Eggert et al. | ............ 74/331 |

FOREIGN PATENT DOCUMENTS

DE 195 24 233 1/1997

(Continued)

OTHER PUBLICATIONS

"New Truck Transmission Shift Smoothly" Machine Design, Penton, Inc. Cleveland, US, vol. 62, No. 4, Feb. 22, 1990, pp. 60-61, XP000102478.

(Continued)

*Primary Examiner*—Charles A. Marmor
*Assistant Examiner*—David D. Le
(74) *Attorney, Agent, or Firm*—Westerman, Hattori, Daniels & Adrian, LLP.

(57) ABSTRACT

An input shaft 10 is connected rotationally with an intermediary shaft 20 through a connecting drive gear GCV, a connecting first idle gear GC1, a connecting second idle gear GC2 and a connecting driven gear GCN. A fourth speed drive gear G4V, which is formed in a one-piece body with a reverse drive gear GRV, is provided rotatably over the input shaft 10, and a third speed drive gear G3V is provided rotatably over the intermediary shaft 20. Both the third speed drive gear G3V and the fourth speed drive gear G4V mesh with a third and fourth speed driven gear G34N, which is provided rotatably over an output shaft 40. Also, a reverse driven gear GRN, which is connected rotationally with the reverse drive gear GRV through a reverse idle gear GRI, is provided rotatably over the output shaft 40.

6 Claims, 3 Drawing Sheets

FOREIGN PATENT DOCUMENTS

| | | | |
|---|---|---|---|
| EP | 512214 A2 * | 11/1992 |
| EP | 1 026 423 | 8/2000 |
| EP | 1 077 336 | 2/2001 |
| JP | 59126140 A * | 7/1984 |
| JP | 02011951 A * | 1/1990 |
| JP | 02026346 A * | 1/1990 |
| JP | 7-94854 | 10/1995 |
| JP | 2000-220700 | 8/2000 |

OTHER PUBLICATIONS

Patent Abstract Japanese, vol. 0071, No. 41, Jun. 21, 19883 and Jp 58-054257, Mar. 31, 1983.

* cited by examiner

| | CT1 | CT2 | CT3 | CT4 | CT5 | CTD |
|---|---|---|---|---|---|---|
| | First speed clutch | Second speed clutch | Third speed clutch | Fourth speed clutch | Fifth speed clutch | Selective clutch |
| Neutral | OFF | OFF | OFF | OFF | OFF | Third and fourth speed driven gear engaged |
| Forward first speed | ON | → | → | → | → | → |
| Forward second speed | OFF | ON | → | → | → | → |
| Forward third speed | → | OFF | ON | → | → | → |
| Forward fourth speed | → | → | OFF | ON | → | → |
| Forward fifth speed | → | → | → | OFF | ON | → |
| Reverse first speed | → | → | ON | OFF | OFF | Reverse driven gear engaged |
| Reverse second speed | → | → | OFF | ON | → | → |

PARALLEL SHAFT TRANSMISSION

RELATED APPLICATION

This application claims the priority of Japanese Patent Application No. 2003-288686 filed on Aug. 7, 2003, which is incorporated herein by reference.

FIELD OF THE INVENTION

The present invention relates to a parallel shaft transmission, in which gears are provided over a plurality of shafts disposed in parallel with one another, the gears being meshed in pairs so that the engagement and disengagement of gears to corresponding ones of the shafts establishes a power transmission path through the shafts in engagement to achieve a desirable speed change ratio, which corresponds to a momentary gear ratio of the transmission.

BACKGROUND OF THE INVENTION

Such parallel shaft transmissions are used in various powered machines including automobiles. In recent years, there has been a tendency that transmissions for use in vehicles are equipped with increasing numbers of speed change ratios because of demands for improvements in driving performance and of concerns on environmental effect. As a result, some transmissions that have more than five speed change ratios for forward drive have been developed for practical use. Generally, as the numbers of speed change ratios of transmissions increase, the numbers of gears disposed over the shafts also increase. This is said equally not only on vehicular transmissions but also on other types of transmissions. Therefore, transmissions tend to increase their sizes especially in the direction of their shafts. However, transmissions are designed to occupy certain limited amounts of space in specific machines or equipment in which they are intended to be installed. Therefore, various ideas have been applied to make the sizes of transmissions as compact as possible when the transmissions are designed to have increasing numbers of speed change ratios. Particularly in designing vehicular transmissions, whose sizes are limited by the sizes of respective vehicles accommodating the corresponding transmissions, it is important to take every measure that can make the transmissions as compact as possible.

Various such measures have been proposed to reduce the sizes of parallel shaft transmissions in axial direction. For example, a structural arrangement is known in which an extra shaft (intermediary shaft) is added between the input and output shafts of a transmission to reduce the number of gears per shaft (for example, refer to Japanese Laid-Open Patent Publication No. 2000-220700). In addition to this structural arrangement, another structural arrangement enables gears disposed on the output shaft to mesh with gears provided over the input shaft, to mesh also with gears provided over the intermediary shaft (for example, refer to Japanese Laid-Open Patent Publication No. 7(1995)-94854). In this arrangement, a gear on the output shaft is used commonly to establish two different speed change ratios, so that the number of gears disposed on the output shaft is made relatively small. Moreover, the gear on the input shaft and that on the intermediary shaft both meshing with such a commonly used gear on the output shaft are placed in a common plane in the transmission. As a result, the size of the transmission in the longitudinal direction of the shafts is much smaller than a similar transmission designed otherwise.

In this transmission, the size of the transmission in the longitudinal direction of the shafts is made relatively small by reducing the number of the gears provided on the output shaft to establish the speed change ratios in forward drive. However, if this transmission is designed to have two speed change ratios in reverse drive for meeting specifications of a vehicle that is designed for driving on bad roads or snow-covered roads, then two gears that correspond to the speed change ratios in reverse drive must be provided in parallel with each other on the output shaft in the same way as a conventional transmission. This provision of the two gears on the output shaft again presents a problem of corresponding increase in the size of the transmission in axial direction.

SUMMARY OF THE INVENTION

To solve the above mentioned problem, it is an object of the present invention to provide a parallel shaft transmission that has a high performance and a compact structure with a relatively small dimension in the axial direction of the transmission even though it is equipped with a plurality of forward drive speed change ratios and two reverse drive speed change ratios.

A parallel shaft transmission according to the present invention comprises an input shaft, a first idle shaft (for example, the connecting idle shaft 30 described in the following embodiment), an intermediary shaft, an output shaft and a second idle shaft (for example, the reversing idle shaft 50 described in the following embodiment), which are disposed in parallel with one another. The parallel shaft transmission further comprises an input-shaft first gear (for example, the connecting drive gear GCV described in the following embodiment), which is provided on the input shaft, an input-shaft second gear (for example, the fourth speed drive gear G4V described in the following embodiment), which is provided rotatably on the input shaft, first clutching means (for example, the fourth speed clutch CT4 described in the following embodiment), which connects or disconnects the input-shaft second gear to or from the input shaft, a first idle gear (for example, the connecting first idle gear GC1 and the connecting second idle gear GC2 described in the following embodiment), which is provided on the first idle shaft to mesh with the input-shaft first gear, an intermediary shaft first gear (for example, the connecting driven gear GCN), which is provided on the intermediary shaft to mesh with the first idle gear, an intermediary shaft second gear (for example, the third speed drive gear G3V described in the following embodiment), which is provided rotatably on the intermediary shaft, second clutching means (for example, the third speed clutch CT3 described in the following embodiment), which connects or disconnects the intermediary shaft second gear to or from the intermediary shaft, an output-shaft first gear (for example, the third and fourth speed driven gear G34N described in the following embodiment), which is provided rotatably on the output shaft to mesh with the input-shaft second gear and with the intermediary shaft second gear, third clutching means (for example, the selective clutch CTD described in the following embodiment), which connects or disconnects the output-shaft first gear to or from the output shaft, an input-shaft third gear (for example, the reverse drive gear GRV described in the following embodiment), which is formed as a one-piece body with the input-shaft second gear and is provided rotatably on the input shaft, a second idle gear (for example, the reverse idle gear GRI described in the following embodiment), which is provided on the second idle shaft to mesh with the input-shaft third gear, an output-shaft second gear (for example, the reverse driven gear GRN), which is provided rotatably on the output shaft to mesh with the second idle gear, and fourth clutching means (for example, the selective clutch CTD), which connects or disconnects the output-shaft second gear to or from the output shaft. In the parallel shaft transmission, preferably, the third clutching means and the fourth clutching means comprise one selective clutching means (for example, the selective clutch CTD), which connects either the output-shaft first gear or the output-shaft second gear to the output shaft.

In this parallel shaft transmission, the rotational power of a prime mover (for example, an engine), which is input to the input shaft of the transmission, is transmitted to the intermediary shaft through the input-shaft first gear, the first idle gear and the intermediary shaft first gear. As a result, the intermediary shaft rotates in the same rotational direction as the input shaft. Here, if (1) the input-shaft second gear is disconnected from the input shaft, and if (2) the intermediary shaft second gear is disconnected from the intermediary shaft, then the transmission is set in a neutral condition, where the rotational power of the prime mover is not transmitted to the output shaft. From this neutral condition, after or while the output-shaft second gear is disconnected from the output shaft, the output-shaft first gear is connected to the output shaft, and the input-shaft second gear is connected to the input shaft to set the transmission into a first speed change condition (this speed change condition corresponds to the forward fourth speed condition described in the following embodiment). In the first speed change condition, the rotational power is transmitted from the input shaft by the first clutching means through the input-shaft second gear and the output-shaft first gear and by the third clutching means to the output shaft, so that the output shaft rotates in one direction (forward direction). Also, from the above mentioned neutral condition, after or while the output-shaft second gear is disconnected from the output shaft, the output-shaft first gear is connected to the output shaft, and the intermediary shaft second gear is connected to the intermediary shaft to set the transmission into a second speed change condition (this speed change condition corresponds to the forward third speed condition described in the following embodiment). In the second speed change condition, the rotational power is transmitted from the input shaft through the input-shaft first gear, the first idle gear and the intermediary shaft first gear to the intermediary shaft and then by the second clutching means through the intermediary shaft second gear and the output-shaft first gear and then by the third clutching means to the output shaft, so that the output shaft rotates in the above mentioned forward direction.

Also, from the above mentioned neutral condition, after or while the output-shaft first gear is disconnected from the output shaft, the output-shaft second gear is connected to the output shaft, and the intermediary shaft second gear is connected to the intermediary shaft to set the transmission into a third speed change condition (this speed change condition corresponds to the reverse first speed condition described in the following embodiment). In the third speed change condition, the rotational power is transmitted from the input shaft through the input-shaft first gear, the first idle gear and the intermediary shaft first gear to the intermediary shaft and then by the second clutching means through the intermediary shaft second gear, the output-shaft first gear (rotating over the output shaft), the input-shaft second gear (rotating over the input shaft), the input-shaft third gear (rotating over the input shaft), the second idle gear and the output-shaft second gear and then by the fourth clutching means to the output shaft, so that the output shaft rotates in the (reverse) direction opposite to the above mentioned forward direction. Also, from the above mentioned neutral condition, after or while the output-shaft first gear is disconnected from the output shaft, the output-shaft second gear is connected to the output shaft, and the input-shaft third gear (the input-shaft third gear is formed with the input-shaft second gear in a one-piece body) is connected to the input shaft to set the transmission into a fourth speed change condition (this speed change condition corresponds to the reverse second speed condition described in the following embodiment). In the fourth speed change condition, the rotational power is transmitted from the input shaft by the first clutching means through the input-shaft third gear, the second idle gear and the output-shaft second gear and then by the fourth clutching means to the output shaft, so that the output shaft rotates in the reverse direction.

The parallel shaft transmission may further comprise an input-shaft fourth gear (for example, the fifth speed drive gear G5V described in the following embodiment), which is provided rotatably on the input shaft, fifth clutching means (for example, the fifth speed clutch CT5 described in the following embodiment), which connects or disconnects the input-shaft fourth gear to or from the input shaft, an intermediary shaft third gear (for example, the second speed drive gear G2V described in the following embodiment), which is provided rotatably on the intermediary shaft, sixth clutching means (for example, the second speed clutch CT2 described in the following embodiment), which connects or disconnects the intermediary shaft third gear to or from the intermediary shaft, and an output-shaft third gear (for example, the second and fifth speed driven gear G25N described in the following embodiment), which is provided on the output shaft to mesh with the input-shaft fourth gear and with the intermediary shaft third gear.

By this arrangement, after the above mentioned conditions (1) and (2) are satisfied, additionally, if the input-shaft fourth gear is disconnected from the input shaft, and the intermediary shaft third gear is disconnected from the intermediary shaft, then the transmission is set in a neutral condition. From this neutral condition, if the input-shaft fourth gear is connected to the input shaft, then the transmission is set into a fifth speed change condition (this speed change condition corresponds to the forward fifth speed condition described in the following embodiment). In the fifth speed change condition, the rotational power is transmitted from the input shaft by the fifth clutching means through the input-shaft fourth gear and the output-shaft third gear to the output shaft, so that the output shaft rotates in the above mentioned forward direction. Also, from the neutral condition, if the intermediary shaft third gear is connected to the intermediary shaft, then the transmission is set into a sixth speed change condition (this speed change condition corresponds to the forward second speed condition described in the following embodiment). In the sixth speed change condition, the rotational power is transmitted from the input shaft through the input-shaft first gear, the first idle gear and the intermediary shaft first gear to the intermediary shaft and then by the sixth clutching means through the intermediary shaft third gear and the output-shaft third gear to the output shaft, so that the output shaft rotates in the above mentioned forward direction.

As described above, the parallel shaft transmission according to the present invention achieves a plurality of forward speed change ratios and two reverse speed change ratios. In the construction of the transmission, the same gear (output-shaft first gear) provided over the output shaft to rotate the output shaft in the forward direction in the first speed change condition is used to rotate the output shaft in the forward direction also in the second speed change condition. In short, this specific gear is commonly used in these speed change conditions. In this way, the number of the gears to be provided over the output shaft for achieving the number of forward speed change ratios is made smaller, so the size of the transmission can be made smaller in axial direction correspondingly to this reduction in the number of the gears provided on the output shaft. Furthermore, in the construction of the transmission, for achieving the two reverse speed change ratios, two power transmission paths (one path that passes through the above mentioned commonly used gear, and the other that does not pass through it) are provided to drive the reverse gear train (comprising the input-shaft third gear, the second idle gear and the output-shaft second gear), which rotates the output shaft in the reversed rotational direction. In other words, the parallel shaft transmission according to the present invention does not have two gears that correspond to the two reverse speed change ratios, on the output shaft, but it has only one gear (output-shaft second gear) for achieving reverse rotation, with the two power transmission paths for rotating this specific gear. As a result, even though the transmission is equipped with two reverse speed change ratios, the number of the gears used for achieving the reverse rotation is the same as a transmission equipped with only one reverse speed change ratio. This arrangement provides a compact parallel shaft transmission with a high performance as the transmission with a relatively small size in its axial direction can be still equipped with a relatively large number of forward speed change ratios and two reverse speed change ratios.

In the above described parallel shaft transmission, the output-shaft first gear and the output-shaft second gear are never connected simultaneously to the output shaft. Therefore, the third clutching means and the fourth clutching means together may comprise one selective clutching means, which connects either the output-shaft first gear or the output-shaft second gear to the output shaft. In this way, the transmission is made lighter and more compact.

If the parallel shaft transmission further comprises an input-shaft fourth gear, which is provided rotatably on the input shaft, fifth clutching means, which connects or disconnects the input-shaft fourth gear to or from the input shaft, an intermediary shaft third gear, which is provided rotatably on the intermediary shaft, sixth clutching means, which connects or disconnects the intermediary shaft third gear to or from the intermediary shaft, and an output-shaft third gear, which is provided on the output shaft to mesh with the input-shaft fourth gear and with the intermediary shaft third gear, then the gear (output-shaft third gear) provided on the output shaft for rotating the output shaft in the forward direction in the fifth speed change condition is used as common gear for rotating the output shaft in the forward direction also in the sixth speed change condition. In this arrangement, even though the transmission achieves additionally two speed change ratios for forward drive, the size of the transmission axially is increased by the degree of only one gear. Therefore, the size of the parallel shaft transmission according to the present invention can be relatively small in its axial direction notwithstanding the large number of speed change ratios of the transmission.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
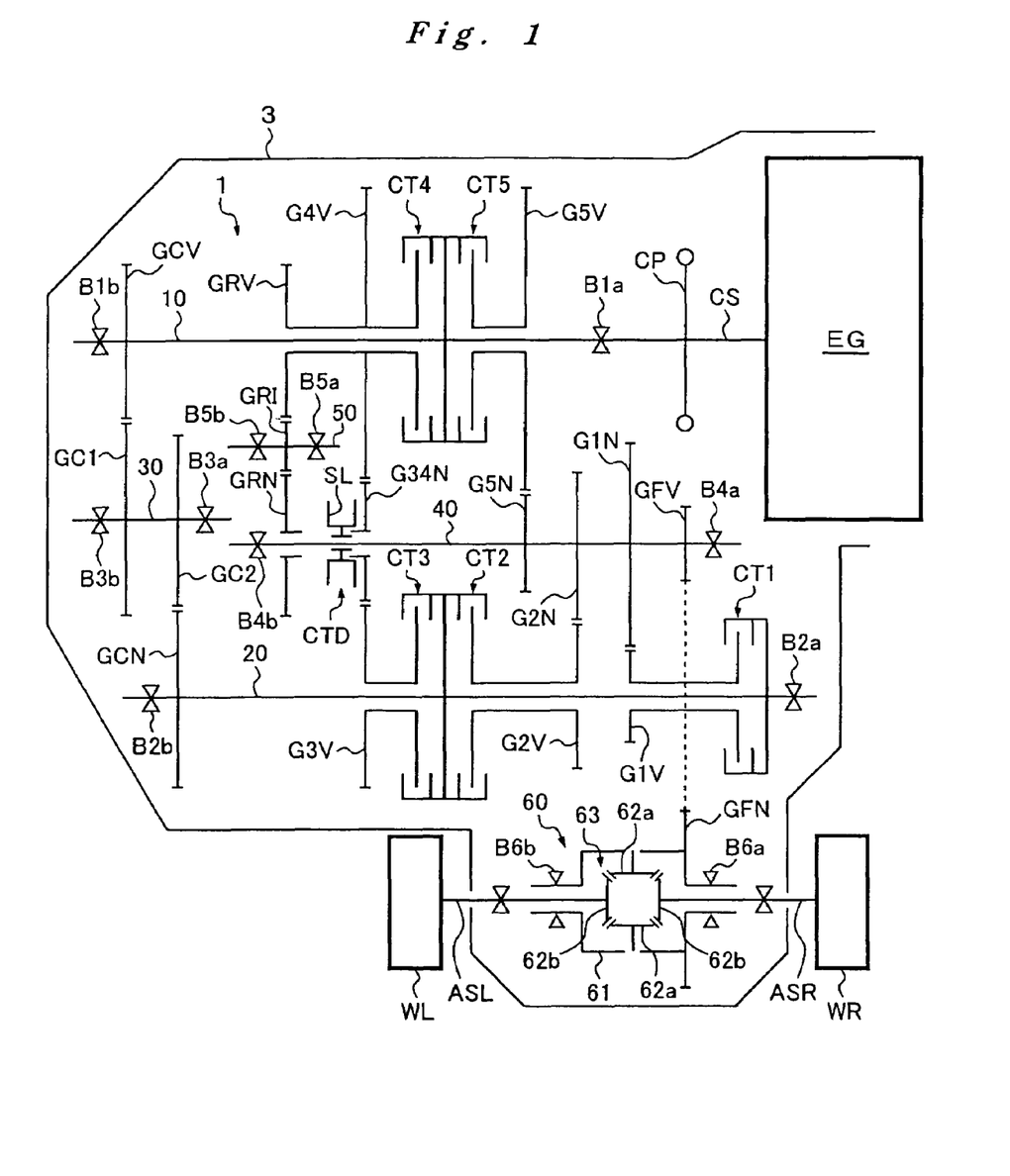
FIG. 1 is a skeleton diagram describing schematically the construction of a parallel shaft transmission as a first embodiment according to the present invention.

Now, preferred embodiments according to the present invention are described in reference to the drawings. FIG. 1 shows a first embodiment of parallel shaft transmission according to the present invention (hereinafter referred to as "the transmission"). The transmission 1 as a first embodiment converts the torque and rotational speed input from an engine EG and transmits the rotational power of the engine EG to a differential mechanism 60, which is connected rotationally to right and left drive wheels WL and WR.

The transmission 1 has an input shaft 10, a connecting idle shaft 30, an intermediary shaft 20, an output shaft 40 and a reversing idle shaft 50, all of which are disposed in parallel with one another and accommodated together with the differential mechanism 60 in a transmission case 3. The input shaft 10 is supported rotatably by bearings B1a and B1b and connected through a coupling mechanism CP to the crank-shaft CS of the engine EG. Over the input shaft 10, disposed from the side of the engine EG (i.e., from the right side of the drawing in FIG. 1) are a fifth speed drive gear G5V, a fifth speed clutch CT5, a fourth speed clutch CT4, a fourth speed drive gear G4V, a reverse drive gear GRV, and a connecting drive gear GCV The fifth speed drive gear G5V is disposed rotatably over the input shaft 10 so that it can rotate idly with respect to the input shaft 10, and the fourth speed drive gear G4V and the reverse drive gear GRV, which are formed together in a one-piece body, are also disposed rotatably over the input shaft 10. However, the connecting drive gear GCV is fixed on the input shaft 10 so that they rotate together as a unified body. The fifth speed clutch CT5 engages or disengages the fifth speed drive gear G5V to or from the input shaft 10 while the fourth speed clutch CT4 engages or disengages the fourth speed drive gear G4V to or from the input shaft 10. The clutches CT4 and CT5 are friction clutches each incorporating a hydraulically actuated piston. Such clutch is well-known in this field, so these clutches do not require any additional description here.

The intermediary shaft 20 is supported also rotatably by bearings B2a and B2b. On this shaft, disposed from the side of the engine EG (i.e., from the right side of the drawing in FIG. 1) are a first speed clutch CT1, a first speed drive gear G1V, a second speed drive gear G2V, a second speed clutch CT2, a third speed clutch CT3, a third speed drive gear G3V and a connecting driven gear GCN. The first speed drive gear G1V, the second speed drive gear G2V and the third speed drive gear G3V are each disposed rotatably over the intermediary shaft 20, but the connecting driven gear GCN is fixed on the intermediary shaft 20. The first speed clutch CT1 engages or disengages the first speed drive gear G1V to or from the intermediary shaft 20, the second speed clutch CT2 engages or disengages the second speed drive gear G2V to or from the intermediary shaft 20 and the third speed clutch CT3 engages or disengages the third speed drive gear G3V to or from the intermediary shaft 20. These clutches CT1, CT2 and CT3 are friction clutches of the same type as the above mentioned clutches CT4 and CT5, so no additional description of the clutches is provided here.

The connecting idle shaft 30 is supported also rotatably by bearings B3a and B3b. On this shaft, disposed from the side of the engine EG (i.e., from the right side of the drawing in FIG. 1) are a connecting second idle gear GC2 and a connecting first idle gear GC1, which are fixed on the connecting idle shaft 30, respectively. The connecting first idle gear GC1 always meshes with the connecting drive gear GCV, which is provided on the input shaft 10, while the connecting second idle gear GC2 always meshes with the connecting driven gear GCN, which is provided on the intermediary shaft 20.

The output shaft 40 is supported also rotatably by bearings B4a and B4b. On this shaft, disposed from the side of the engine EG (i.e., from the right side of the drawing in FIG. 1) are a differential drive gear GFV, a first speed driven gear G1N, a second speed driven gear G2N, a fifth speed driven gear G5N, a third and fourth speed driven gear G34N, a selective clutch CTD and a reverse driven gear GRN. The differential drive gear GFV, the first speed driven gear G1N, the second speed driven gear G2N and the fifth speed driven gear G5N are each fixed on the output shaft 40 while the third and fourth speed driven gear G34N and the reverse driven gear GRN are each provided rotatably over the output shaft 40. The differential drive gear GFV always meshes with a differential driven gear GFN, which drives the differential mechanism 60 (the broken line drawn between the differential drive gear GFV and the differential driven gear GFN in FIG. 1 represents that these gears GFV and GFN mesh with each other. The same is said for FIG. 3). The first speed driven gear G1N always meshes with the first speed drive gear G1V, which is provided on the intermediary shaft 20, and the second speed driven gear G2N always meshes with the second speed drive gear G2V, which is provided on the intermediary shaft 20. The third and fourth speed driven gear G34N always meshes, respectively, with the third speed drive gear G3V, which is provided on the intermediary shaft 20, and with the first speed drive gear G4V, which is provided on the input shaft 10.

The selective clutch CTD, which is provided axially slidably on the output shaft 40, is integrated with a selector SL whose position over the output shaft 40 is controlled to shift axially by the operation of a hydraulic mechanism (not shown). When the selector SL is shifted in either direction, the dog teeth (not shown) of the selector clutches the closer side of the third and fourth speed driven gear G34N or that of the reverse driven gear GRN, correspondingly. As a result, either the third and fourth speed driven gear G34N or the reverse driven gear GRN is brought into engagement to transmit the rotation to the output shaft 40. In other words, if the selector SL of the selective clutch CTD is shifted onto the side of the third and fourth speed driven gear G34N (rightward in the drawing of FIG. 1), then the third and fourth speed driven gear G34N is connected to the output shaft 40 rotationally. On the other hand, if the selector SL is shifted onto the side of the reverse driven gear GRN (leftward in the drawing of FIG. 1), then the reverse driven gear GRN is connected to the output shaft 40 rotationally.

The reversing idle shaft 50 is supported also rotatably by bearings B5a and B5b, and a reverse idle gear GRI is fixed on this shaft. The reverse idle gear GRI always meshes with the reverse drive gear GRV, which is provided on the input shaft 10, and with the reverse driven gear GRN, which is provided on the output shaft 40.

The differential mechanism 60 has a differential mechanism 63 in a differential case 61, the differential mechanism 63 comprising two differential pinions 62a and two side gears 62b. Right and left axles ASR and ASL, which are disposed in parallel with the output shaft 40, are fixed to the side gears 62b, respectively, and the differential case 61 is supported by bearings B6a and B6b. In this condition, the differential case 61 can rotate around the axis of the right and left axles ASR and ASL, which have, correspondingly, right and left drive wheels WR and WL (front wheels of the vehicle). Because the differential driven gear GFN, which is fixed on the differential case 61, always meshes with the differential drive gear GFV as mentioned above, the whole of the differential mechanism 60 rotates around the right and left axles ASR and ASL as the output shaft 40 rotates.

Figure 2:
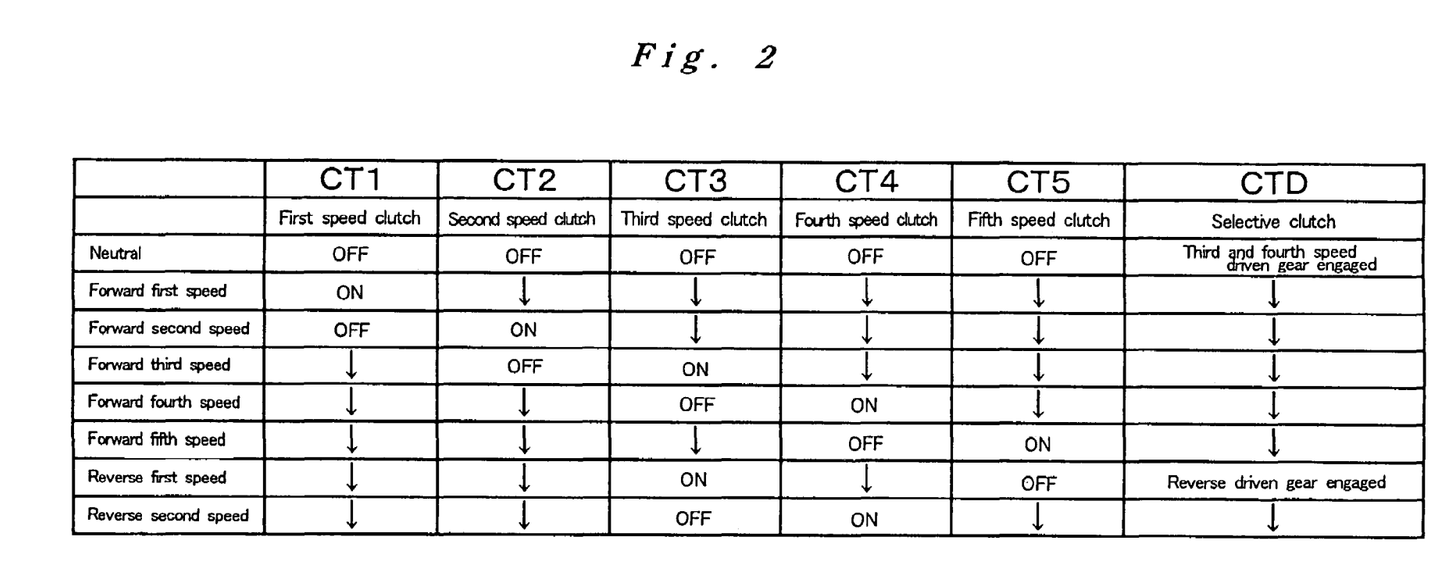
FIG. 2 is a table describing relations between the condition of first~fifth clutches and a selective clutch and the speed change ratio of the first embodiment transmission.

Now, in reference to FIG. 1 and to FIG. 2, power transmission paths available in the transmission 1 are described in relation to the condition of the transmission 1. FIG. 2 is a table describing relations between the operational condition of the first~fifth clutches CT1, CT2, CT3, CT4 and CT5 and the selective clutch CTD and the speed change ratios of the transmission 1. The columns with headings CT1, CT2, CT3, CT4 and CT5 in the table represent the corresponding clutches, respectively, and in each column, a cell marked by "ON" represents that the clutch represented by the column is set to connect the corresponding gear to the corresponding shaft (i.e., the input shaft 10 or the intermediary shaft 20). If a cell is marked by "OFF", then it represents that the clutch is set to disconnect the corresponding gear from the corresponding shaft (i.e., the input shaft 10 or the intermediary shaft 20). In each column, a cell marked by a downward arrow represents the same condition for the clutch as represented by the cell right above.

The rotational power of the engine EG is input from the crank-shaft CS through the coupling mechanism CP to the input shaft 10 of the transmission 1, and it is then transmitted through the connecting drive gear GCV and the connecting first idle gear GC1 to the connecting idle shaft 30 and further through the connecting second idle gear GC2 and the connecting driven gear GCN to the intermediary shaft 20. As a result, the intermediary shaft 20 rotates together with the input shaft 10 in the same rotational direction. In this condition, if the first speed clutch CT1, the second speed clutch CT2, the third speed clutch CT3, the fourth speed clutch CT4 and the fifth speed clutch CT5 are all off, then the first speed drive gear G1V, the second speed drive gear G2V and the third speed drive gear G3V are all rotationally disconnected from the intermediary shaft 20, and the fourth speed drive gear G4V and the fifth speed drive gear G5V are also disconnected from the input shaft 10. As a result, the rotational power of the engine EG is not transmitted to the output shaft 40. This is a neutral condition of the transmission 1. In this neutral condition, the selector SL of the selective clutch CTD is positioned to the third and fourth speed driven gear G34N. In other words, the third and fourth speed driven gear G34N is connected to the output shaft 40 while the reverse driven gear GRN is disconnected from the output shaft 40.

To switch the transmission 1 from the above described neutral condition to a forward first speed condition, the first speed clutch CT1 is turned from "OFF" to "ON" to connect the first speed drive gear G1V to the intermediary shaft 20. In this condition, or the forward first speed condition of the transmission 1, the power of the engine EG, which is transmitted from the input shaft 10 through the connecting drive gear GCV and the connecting first idle gear GC1 to the connecting idle shaft 30 and further through the connecting second idle gear GC2 and the connecting driven gear GCN to the intermediary shaft 20, is transmitted by the first speed clutch CT1 through the first speed drive gear G1V and the first speed driven gear G1N to the output shaft 40.

To switch the transmission 1 from the forward first speed condition to a forward second speed condition, the first speed clutch CT1 is turned from "ON" to "OFF", and the second speed clutch CT2 is turned from "OFF" to "ON". As a result, the first speed drive gear G1V is disconnected from the intermediary shaft 20 while the second speed drive gear G2V is connected to the intermediary shaft 20. In this condition, or the forward second speed condition of the transmission 1, the power of the engine EG, which is transmitted from the input shaft 10 through the connecting drive gear GCV and the connecting first idle gear GC1 to the connecting idle shaft 30 and further through the connecting second idle gear GC2 and the connecting driven gear GCN to the intermediary shaft 20, is transmitted by the second speed clutch CT2 through the second speed drive gear G2V and the second speed driven gear G2N to the output shaft 40.

To switch the transmission 1 from the forward second speed condition to a forward third speed condition, the second speed clutch CT2 is turned from "ON" to "OFF", and the third speed clutch CT3 is turned from "OFF" to "ON". As a result, the second speed drive gear G2V is disconnected from the intermediary shaft 20 while the third speed drive gear G3V is connected to the intermediary shaft 20. In this condition, or the forward third speed condition of the transmission 1, the power of the engine EG, which is transmitted from the input shaft 10 through the connecting drive gear GCV and the connecting first idle gear GC1 to the connecting idle shaft 30 and further through the connecting second idle gear GC2 and the connecting driven gear GCN to the intermediary shaft 20, is transmitted by the third speed clutch CT3 through the third speed drive gear G3V and the third and fourth speed driven gear G34N and then by the selective clutch CTD to the output shaft 40.

To switch the transmission 1 from the forward third speed condition to a forward fourth speed condition, the third speed clutch CT3 is turned from "ON" to "OFF", and the fourth speed clutch CT4 is turned from "OFF" to "ON". As a result, the third speed drive gear G3V is disconnected from the intermediary shaft 20 while the fourth speed drive gear G4V is connected to the input shaft 10. In this condition, or the forward fourth speed condition of the transmission 1, the power of the engine EG from the input shaft 10 is transmitted by the fourth speed clutch CT4 through the fourth speed drive gear G4V and the third and fourth speed driven gear G34N and then by the selective clutch CTD to the output shaft 40.

To switch the transmission 1 from the forward fourth speed condition to a forward fifth speed condition, the fourth speed clutch CT4 is turned from "ON" to "OFF", and the fifth speed clutch CT5 is turned from "OFF" to "ON". As a result, the fourth speed drive gear G4V is disconnected from the input shaft 10 while the fifth speed drive gear G5V is connected to the input shaft 10. In this condition, or the forward fifth speed condition of the transmission 1, the power of the engine EG from the input shaft 10 is transmitted by the fifth speed clutch CT5 through the fifth speed drive gear G5V and the fifth speed driven gear G5N to the output shaft 40.

To switch the transmission 1 from the above described neutral condition to a reverse first speed condition, the third speed clutch CT3 is turned from "OFF" to "ON", and the selector SL of the selective clutch CTD is shifted from the third and fourth speed driven gear G34N to the reverse driven gear GRN. As a result, the third speed drive gear G3V is connected to the intermediary shaft 20, and the reverse driven gear GRN is connected to the output shaft 40. In this condition, or the reverse first speed condition of the transmission 1, the power of the engine EG is first transmitted from the input shaft 10 through the connecting drive gear GCV and the connecting first idle gear GC1 to the connecting idle shaft 30 and further through the connecting second idle gear GC2 and the connecting driven gear GCN to the intermediary shaft 20. This rotational power is then transmitted by the third speed clutch CT3 through the third speed drive gear G3V, the third and fourth speed driven gear G34N, which rotates over the output shaft 40, and the fourth speed drive gear G4V and then through the reverse drive gear GRV, which is formed with the fourth speed drive gear G4V in a one-piece body as mentioned above and rotates over the input shaft 10, and the reverse idle gear GRI to the reverse driven gear GRN, whose rotation is transmitted by the selective clutch CTD to the output shaft 40.

To switch the transmission 1 from the reverse first speed condition to a reverse second speed condition, the third speed clutch CT3 is turned from "ON" to "OFF", and the fourth speed clutch CT4 is turned from "OFF" to "ON". As a result, the third speed drive gear G3V is disconnected from the intermediary shaft 20 while the reverse drive gear GRV, which is formed in a one-piece body with the fourth speed drive gear G4V, is connected to the input shaft 10. In this condition, or the reverse second speed condition of the transmission 1, the power of the engine EG is transmitted by the fourth speed clutch CT4 from the input shaft 10 through the reverse drive gear GRV and the reverse idle gear GRI to the reverse driven gear GRN, whose rotation is transmitted by the selective clutch CTD to the output shaft 40.

In the transmission 1 as a first embodiment, which achieves five forward speed change ratios and two reverse speed change ratios as described above, the gear (third and fourth speed driven gear G34N) provided over the output shaft 40 to rotate the output shaft 40 in the forward direction in the forward third speed condition is used to rotate the output shaft 40 in the forward direction also in the forward fourth speed condition. In short, this specific gear is commonly used both in the forward third speed condition and in the forward fourth speed condition. In this way, the number of the gears to be provided over the output shaft 40 for achieving the number of forward speed change ratios is made smaller, so the size of the transmission 1 in its axial direction can be made smaller correspondingly to this gear reduction. For the two reverse speed change ratios, two power transmission paths (one path that passes through the third and fourth speed driven gear G34N, which is the above mentioned common gear, and the other that does not pass through it) are arranged to drive the reverse gear train (comprising the reverse drive gear GRV, the reverse idle gear GRI and the reverse driven gear GRN), which rotates the output shaft 40 in the reverse direction. In other words, the transmission 1 in this embodiment does not have two gears on the output shaft 40 to correspond to the two reverse speed change ratios, but it has only one gear (reverse driven gear GRN) for achieving reverse rotation, with two power transmission paths for rotating this specific gear. Even though the transmission is equipped with two reverse speed change ratios, the number of the gears used for achieving the reverse rotation is the same as a transmission equipped with a single reverse speed change ratio. As a result, the transmission according to the present invention can achieve a relatively small size in its axial direction notwithstanding the relatively large number of forward speed change ratios and the two reverse speed change ratios of the transmission. In this way, the present invention provides a compact transmission that has a high performance.

Figure 3:
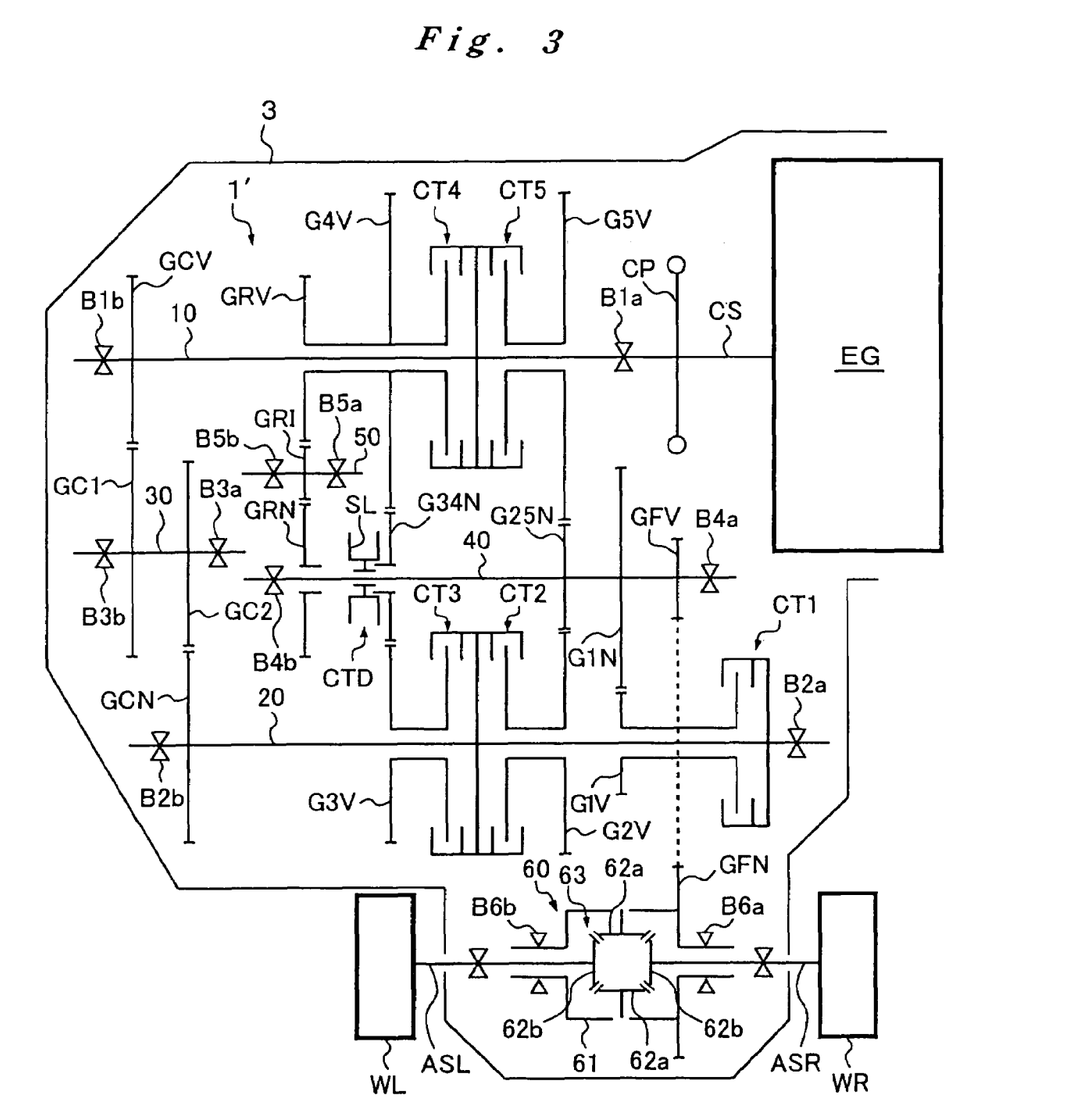
FIG. 3 is a skeleton diagram describing schematically the construction of a parallel shaft transmission as a second embodiment according to the present invention.

Next, a second embodiment of transmission according to the present invention is described in reference to FIG. 3, which shows a transmission 1' as a second embodiment. In the drawing, components that are identical with those of the transmission 1 described above as a first embodiment are given identical numbers, respectively. A difference between the transmission 1' as a second embodiment and the transmission 1 as a first embodiment is that the transmission 1' does not have the second speed driven gear G2N and the fifth speed driven gear G5N of the transmission 1 as a first embodiment, but it has, instead, one second and fifth speed driven gear G25N, which has the functions of the second speed driven gear G2N and the fifth speed driven gear G5N. The second and fifth speed driven gear G25N is fixed on the output shaft 40 such that it always meshes with the second speed drive gear G2V and with the five speed drive gear G5V, both of which are placed in a common plane in the transmission 1' as a second embodiment.

If the relations between the operational condition of the first~fifth clutches CT1, CT2, CT3, CT4 and CT5 and the selective clutch CTD and the speed change ratios of the transmission 1' were described in a table, the resulting table would be the same as the table (shown in FIG. 2) presented for the transmission 1 as a first embodiment. Therefore, such a table for the second embodiment is not presented here. Now, the power transmission paths of the transmission 1' are described in relation to the speed change ratios of the transmission 1'. However, the condition of the clutches and the gears of the transmission 1' as a second embodiment is the same as that of the transmission 1 as a first embodiment in cases where the transmission 1' is in its neutral condition, is upshifted from the neutral condition to its forward first speed condition, is upshifted from its forward second speed condition to its forward third speed condition, is upshifted from the forward third speed condition to its forward fourth speed condition, is shifted from the neutral condition to its reverse first speed condition, and is shifted from the reverse first speed condition to its reverse second speed condition. Therefore, no description is given here for those cases.

To switch the transmission 1' as a second embodiment from the forward first speed condition to the forward second speed condition, the first speed clutch CT1 is turned from "ON" to "OFF", and the second speed clutch CT2 is turned from "OFF" to "ON". As a result, the first speed drive gear G1V is disconnected from the intermediary shaft 20 while the second speed drive gear G2V is connected to the intermediary shaft 20. In this condition, or the forward second speed condition of the transmission 1', the power of the engine EG, which is transmitted from the input shaft 10 through the connecting drive gear GCV and the connecting first idle gear GC1 to the connecting idle shaft 30 and further through the connecting second idle gear GC2 and the connecting driven gear GCN to the intermediary shaft 20, is transmitted by the second speed clutch CT2 through the second speed drive gear G2V and the second and fifth speed driven gear G25N to the output shaft 40.

To switch the transmission 1' from the forward fourth speed condition to the forward fifth speed condition, the fourth speed is clutch CT4 is turned from "ON" to "OFF" while the fifth speed clutch CT5 is turned from "OFF" to "ON". As a result, the fourth speed drive gear G4V is disconnected from the input shaft 10 while the fifth speed drive gear G5V is connected to the input shaft 10. In this condition, or the forward fifth speed condition of the transmission 1', the power of the engine EG from the input shaft 10 is transmitted by the fifth speed clutch CT5 through the fifth speed drive gear G5V and the second and fifth speed driven gear G25N to the output shaft 40.

By adopting the construction of the transmission 1 as a first embodiment, the transmission 1' as a second embodiment achieves five forward speed change ratios and two reverse speed change ratios, which are also achieved by the transmission 1 as a first embodiment. In addition to the adoption of the construction of the first embodiment, the transmission 1' as a second embodiment uses, as a commonly used gear, a gear (second and fifth speed driven gear G25N) provided over the output shaft 40 for rotating the output shaft 40 in the forward direction both in the forward second speed condition and in the forward fifth speed condition. Therefore, the contribution of the two forward speed change ratios to the size of the transmission 1' axially is effected by the degree of only one gear, i.e., the commonly used gear, so the size in axial direction can be relatively small notwithstanding the large number of speed change ratios of the transmission 1'.

By the way, in a structure that includes a gear train provided over three shafts with component gears meshing simultaneously, such as the structure of the above described transmissions (transmission 1 and transmission 1'), gears may experience a "sway" because of the axial thrusts generated from the contact of tooth faces of the gears during the torque transmission. As a result, a noise may be generated if the tooth bearing of the gears becomes insufficient. To avoid such discomfort, or to control the generation of such noise, the three shafts whose gears mesh with one another simultaneously, i.e., the input shaft 10, the intermediary shaft 20 and the output shaft 40, can be disposed in a common plane to reduce the effect of the "sway" of these gears.

Preferred embodiments according to the present invention have been described above. However, the scope of the present invention is not limited to the above described embodiments. For example, between the connecting drive gear GCV and the connecting driven gear GCN, two idle gears (the connecting first idle gear GC1 and the connecting second idle gear GC2) are positioned in the above embodiments, but the structure can be arranged to include only one idle gear.

Also, in the above embodiments, selective clutching means (selective clutch CTD) is used to connect either the third and fourth speed driven gear G34N or the reverse driven gear GRN because the third and fourth speed driven gear G34N and the reverse driven gear GRN are never connected simultaneously to the output shaft 40. In other words, this clutching means as a unit functions both as clutching means that connects or disconnects the third and fourth speed driven gear G34N to or from the output shaft 40 and as clutching means that connects or disconnects the reverse driven gear GRN to or from the output shaft 40. This arrangement is effective in lightening and compacting the transmission. However, separate clutching means may be provided instead, one for connecting or disconnecting the third and fourth speed driven gear G34N to or from the output shaft 40 and the other for connecting or disconnecting the reverse driven gear GRN to or from the output shaft 40. In this case, these clutching means can be the same friction clutches as used for the other clutching means.

In the above described transmissions (both the transmission 1 and the transmission 1'), the on and off actions of the clutches for each speed change ratio are determined in correspondence to the diameters of the gears and the distances among the shafts. The combination of the on and off actions of the clutches presented in the above description is only an example. In other words, a variety of combinations of the on and off actions are possible if the gears have different diameters with correspondingly different distances among the shafts.

In the above embodiments, parallel shaft transmissions according to the present invention are exemplified for use in vehicles. However, these embodiments are only examples. The use of parallel shaft transmissions according to the present invention is not limited to vehicles, and it can be used in various powered machines.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parallel shaft transmission comprising:
   an input shaft, a first idle shaft, an intermediary shaft, an output shaft and a second idle shaft, which are disposed in parallel with one another;
   an input-shaft first gear, which is provided on said input shaft;
   an input-shaft second gear, which is provided rotatably on said input shaft;
   first clutching means, which connects or disconnects said input-shaft second gear to or from said input shaft;
   a first idle gear, which is provided on said first idle shaft to mesh with said input-shaft first gear;
   an intermediary shaft first gear, which is provided on said intermediary shaft to be driven by said first idle gear;
   an intermediary shaft second gear, which is provided rotatably on said intermediary shaft;
   second clutching means, which connects or disconnects said intermediary shaft second gear to or from said intermediary shaft;
   an output-shaft first gear, which is provided rotatably on said output shaft to mesh with said input-shaft second gear and with said intermediary shaft second gear;
   third clutching means, which connects or disconnects said output-shaft first gear to or from said output shaft;
   an input-shaft third gear, which is formed in a one-piece body with said input-shaft second gear and is provided rotatably on said input shaft;
   a second idle gear, which is provided on said second idle shaft to mesh with said input-shaft third gear;
   an output-shaft second gear, which is provided rotatably on said output shaft to mesh with said second idle gear; and
   fourth clutching means, which connects or disconnects said output-shaft second gear to or from said output shaft.

2. The parallel shaft transmission as set forth in claim 1, wherein:
   said third clutching means and said fourth clutching means comprise one selective clutching means, which connects either said output-shaft first gear or said output-shaft second gear to said output shaft.

3. The parallel shaft transmission as set forth in claim 1, further comprising a secondary idle gear provided on said first idle shaft which meshes with said intermediary shaft first gear,
   wherein side first idle gear and said secondary idle gear on said first idle shaft are both fixed on said first idle shaft in order to rotate as a one-piece body.

4. The parallel shaft transmission as set forth in claim 1, wherein:
   a first reverse drive ratio is established by disengaging said first clutching means, by engaging said second clutching means, by disengaging said third clutching means, and by engaging said fourth clutching means; and
   a second reverse drive ratio is established by engaging said first clutching means, by disengaging said second clutching means, by disengaging said third clutching means, and by engaging said fourth clutching means.

5. The parallel shaft transmission as set forth in claim 4, wherein:
   a forward drive ratio is established by engaging said first clutching means, by disengaging said second clutching means, by engaging said third clutching means, and by disengaging said fourth clutching means.

6. The parallel shaft transmission as set forth in claim 1 or 2, further comprising:
   an input-shaft fourth gear, which is provided rotatably on said input shaft;
   fifth clutching means, which connects or disconnects said input-shaft fourth gear to or from said input shaft;
   an intermediary shaft third gear, which is provided rotatably on said intermediary shaft;
   sixth clutching means, which connects or disconnects said intermediary shaft third gear to or from said intermediary shaft; and
   an output-shaft third gear, which is provided on said output shaft to mesh with said input-shaft shaft fourth gear and with said intermediary shaft third gear.

* * * * *